United States Patent [19]
Takamoto et al.

[11] Patent Number: 5,981,628
[45] Date of Patent: Nov. 9, 1999

[54] THERMOPLASTIC RESIN MOLDED ARTICLE

[75] Inventors: Katsunori Takamoto; Akihiro Mochizuki, both of Tsukuba, Japan

[73] Assignee: Kuraray Co., Ltd., Kurashiki, Japan

[21] Appl. No.: 09/024,453

[22] Filed: Feb. 17, 1998

[30] Foreign Application Priority Data

Feb. 28, 1997 [JP] Japan .................................. 9-062503

[51] Int. Cl.$^6$ .................................................. C08L 83/00
[52] U.S. Cl. ........................................ 523/201; 524/450
[58] Field of Search .............................. 524/450; 523/201

[56] References Cited

U.S. PATENT DOCUMENTS

| | | | |
|---|---|---|---|
| 4,211,690 | 7/1980 | Asano | 260/42.46 |
| 4,393,153 | 7/1983 | Hepp | 523/201 |
| 4,672,086 | 6/1987 | Seiler | 524/539 |
| 4,737,536 | 4/1988 | Kawase | 524/451 |
| 4,753,845 | 6/1988 | Sumi | 428/327 |
| 4,945,131 | 7/1990 | Ting | 525/68 |
| 5,098,624 | 3/1992 | Smith | 264/119 |
| 5,114,997 | 5/1992 | Golder et al. . | |
| 5,159,003 | 10/1992 | Baghaii | 524/288 |
| 5,179,144 | 1/1993 | Yamamoto | 524/504 |
| 5,391,607 | 2/1995 | Fujii | 524/449 |

FOREIGN PATENT DOCUMENTS

| | | |
|---|---|---|
| 0 080 599 | 6/1983 | European Pat. Off. . |
| 0 185 103 | 6/1986 | European Pat. Off. . |
| 0 371 753 | 6/1990 | European Pat. Off. . |
| 0 423 509 A1 | 4/1991 | European Pat. Off. . |
| 0 499 927 A2 | 8/1992 | European Pat. Off. . |
| 0 604 074 A1 | 6/1994 | European Pat. Off. . |

*Primary Examiner*—Paul R. Michl
*Attorney, Agent, or Firm*—Oblon, Spivak, McClelland, Maier & Neustadt, P.C.

[57] ABSTRACT

A thermoplastic resin molded article having gloss of at least one surface above 80%, a storage modulus in common logarithm being 7 to 8 MPa within a temperature range higher by 20° C. to 100° C. than the glass transition temperature, a cooling distortion ratio of 1.0 kg/cm$^2$·°C. or less when the molded article is cooled from 130° C. to 50° C. and an Izod impact strength of 2.0 kj/m$^2$ or more, is provided, together with a thermoplastic resin composition containing a polybutylene terephthalate resin, a polyethylene terephthalate resin, a (metha)acrylic resin, a polymer particle of a multi-layer structure and an inorganic filler, which composition is used for producing the molded article.

6 Claims, 3 Drawing Sheets

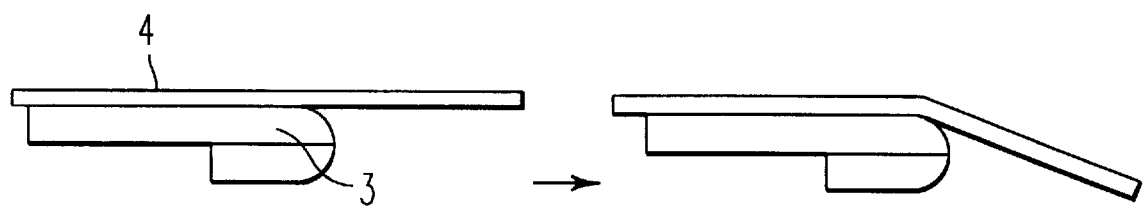
*FIG. 2A*   *FIG. 2B*
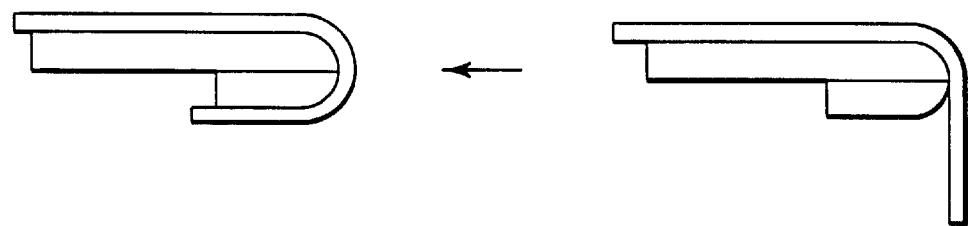
*FIG. 2D*   *FIG. 2C*

THERMOPLASTIC RESIN MOLDED ARTICLE

BACKGROUND OF THE INVENTION

1. Field of the Invention

The present invention relates to a thermoplastic resin molded article, a method for producing the same, a processed article produced by subjecting the thermoplastic resin molded article to heating process, and a thermoplastic resin composition preferably used for producing the thermoplastic resin molded article. More specifically, the present invention relates to a thermoplastic resin molded article of high-grade quality owing to the excellent surface gloss, transparency and color tone thereof, and with excellent heating processability involving a smaller cooling distortion ratio during the bending process under heating and with less inner distortion in the resulting processed article which consequently can procure good impact resistance with no occurrence of break or damage, a thermoplastic resin composition preferably used therefor, a processed article produced by subjecting the thermoplastic resin molded article to heating process, and a method for producing the thermoplastic resin molded article. By utilizing the excellent properties thereof in an active fashion, the thermoplastic resin molded article of the present invention can effectively be used for a wide variety of utilities, such as interior housing materials and interior equipment including the top boards, doors and walls of system kitchens, the top boards of washing and dressing units, the side walls and aprons of unit baths, and the counter boards of bay windows.

2. Description of the Prior Art

Composite materials of melamine resin decorating boards and artificial marbles from (metha)acrylic resins and unsaturated polyester resins with other materials such as composite boards and calcium silicate boards, have conventionally been used as interior housing materials and interior equipment, such as the top boards of system kitchens, the top boards of washing and dressing units, the side walls and aprons of unit baths, the doors and wall of housings, and the counter boards of bay windows.

However, those produced by using melamine resin decorating boards are poor in terms of high-grade quality and have larger inner distortion at bending parts processed under heating, so that they have significantly low impact strength at the bending processed parts, disadvantageously. Therefore, they are not sufficiently satisfactory.

Artificial marbles produced by using (metha) acrylic resins and unsaturated polyester resins have marvelous high-grade touch compared with those of melamine resin decorating boards, but because the (metha) acrylic resins and unsaturated polyester resins used therein are thermosetting resins, these artificial marbles cannot be produced smoothly by an extrusion molding method at a high productivity. Generally, thus, casting method or press method at a lower productivity, compared with extrusion molding, has been used, which inevitably involves higher production cost. Additionally because it is difficult to subject these artificial marbles to bending process under heating, curved parts (R parts) should necessarily be formed through cutting process costing a longer time and laborious works, which inevitably involves higher processing cost.

Furthermore, it has been known an artificial marble with the base of (metha)acrylic resins which can be bent under heating, but because the resins therein are cross linked together, the marble does not have satisfactory processability. Thus, the shapes formed from the marble through heating process are limited.

For the purpose of producing molded articles with improved heating processability and impact resistance, proposition has been made of resin compositions for thermoplastic molding, into which polybutylene terephthalate, polyethylene terephthalate, polycarbonate and inorganic fillers are preliminarily blended (Japanese Patent Laid-open No. Hei 6-279665 and U.S. Pat. No. 5,441,997). However, barium sulfate used as an inorganic filler in the resin compositions has such a larger difference in refractive index from the resins, that the resulting molded articles with poor surface transparency and gloss are likely to lack high-grade quality.

SUMMARY OF THE INVENTION

It is an object of the present invention to provide a thermoplastic resin molded article with excellent surface gloss, transparency, and color tone and with high-grade touch.

It is another object of the present invention to provide a thermoplastic resin molded article with such excellent heating processability that processed articles of given shapes can be produced simply and readily by subjecting the resin molded article to heating process such as bending process under heating, not to cutting process or grinding process.

It is a still further object of the present invention to provide a thermoplastic resin molded article with such smaller cooling distortion at heating process, involving less residual distortion in processed articles, which are consequently highly impact resistant with no occurrence of crack or damage.

It is a further object of the present invention to provide a thermoplastic resin composition to be used effectively for producing the thermoplastic resin molded article with the aforementioned excellent properties.

It is a yet further object of the present invention to provide a method for producing the thermoplastic resin molded article, and a processed article produced by subjecting the thermoplastic resin molded article to heating process.

As the consequence of various investigations by the present inventors to attain the objects described above, the present inventors have found that a thermoplastic resin molded article with surface gloss of 80% or more, a specific storage modulus within a temperature range higher by 20° C. to 100° C. than the glass transition temperature, a cooling distortion ratio of a specific value or less when the molded article is cooled from 130° C. to 50° C., and an Izod impact strength of a specific value or more, has such good heating processability that the cooling distortion ratio is so small, leading to extremely less residual distortion in the processed article and that processed articles therefrom at heating process have so excellent impact resistance with no occurrence of crack or damage that the articles can preferably be used as housing interior materials and interior equipment such as the top boards of system kitchens, the top boards of washing and dressing units, the side walls and aprons of unit baths, the doors and walls of housing and the counter boards of bay windows.

Additionally, the present inventors have found that the thermoplastic resin molded article described above has so excellent surface gloss, transparency and color tone, involving high-grade touch that the article can effectively be used for a wide variety of utilities, after the article is processed with heating process or even when the article remains as it is with no heating process.

Furthermore, the present inventors have found that the thermoplastic resin molded article with such excellent properties can be produced at a high productivity in a smooth manner, by using a thermoplastic resin composition containing a polybutylene terephthalate resin, a polyethylene terephthalate resin, a (metha)acrylic resin, a polymer particle of a multi-layer structure and an inorganic filler, according to molding methods for wide use for molding thermoplastic resins, such as extrusion molding. Based on these findings, the inventors have achieved the present invention.

More specifically, the present invention is a thermoplastic resin molded article with gloss of at least one surface above 80%, a storage modulus in common logarithm being 7 to 8 MPa within a temperature range higher by 20° C. to 100° C. than the glass transition temperature, a cooling distortion ratio of 1.0 kg/cm$^2$·°C. or less when the molded article is cooled from 130° C. to 50° C. and an Izod impact strength of 2.0 kj/m$^2$ or more.

Additionally, the present invention encompasses thermoplastic resin molded articles produced from a composite preparation of the thermoplastic resin molded article and other materials, as well as processed articles produced by treating these thermoplastic resin molded articles at heating process.

Still additionally, the present invention relates to a thermoplastic resin composition containing (A) polybutylene terephthalate resin, (B) polyethylene terephthalate resin, (C) (metha)acrylic resin, (D) polymer particle of multi-layer structure and (E) inorganic filler.

Additionally, the present invention encompasses a method for producing the thermoplastic resin molded article by using the thermoplastic resin composition by extrusion molding.

BRIEF DESCRIPTION OF THE DRAWINGS

FIG. 2 depicts a chart of the production process of composite materials in the examples or comparative examples.

DETAILED DESCRIPTION OF THE PREFERRED EMBODIMENTS

Figures 1A, 1B:
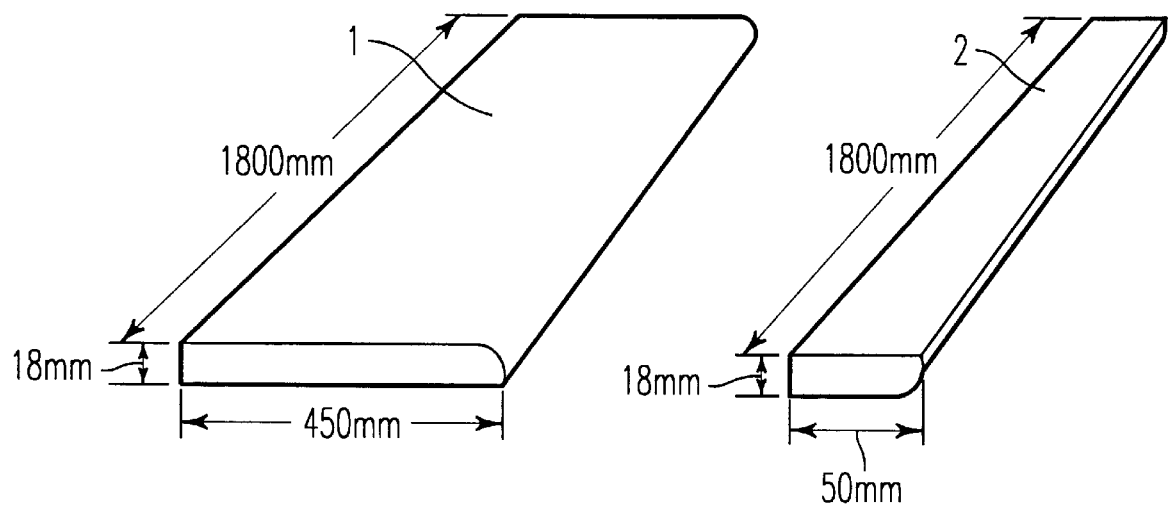
FIGS. 1A, 1B, and 1C are views depicting a lining material used in examples or comparative examples in the present Specification.

The thermoplastic resin molded article of the present invention satisfies the following requirements; gloss of at least one surface above 80%, a storage modulus in common logarithm being 7 to 8 MPa within a temperature range higher by 20° C. to 100° C. than the glass transition temperature, a cooling distortion ratio of 1.0 kg/cm$^2$·°C. or less when the molded article is cooled from 130° C. to 50° C. and an Izod impact strength of 2.0 kj/m$^2$ or more.

The thermoplastic resin molded article of the present invention may satisfactorily have the gloss of at least one surface above 80%, the gloss of two or more surfaces above 80% or the gloss of the entire surfaces above 80%. The molded article satisfactorily has the gloss of at least exposed surfaces above 80%. If the thermoplastic resin molded article has no surface of gloss above 80%, the resulting processed article loses high-grade touch.

The term "gloss of at least one surface" of the molded article, referred to herein in the present Specification, means the 60° specular surface gloss of at least one surface of the molded article when measured according to JIS K 7105, and the specific method therefor will be described in the following examples.

Due to the storage modulus of 7 to 8 MPa in common logarithm of the thermoplastic resin molded article within a temperature range higher by 20° C. to 100° C. than the glass transition temperature, the thermoplastic resin molded article can readily be processed by heating process to produce processed articles. If the storage modulus in common logarithm of the thermoplastic resin molded article within a temperature range higher by 20° C. to 100° C. than the glass transition temperature is below 7 MPa, the mold mark remains on the surface of the molded article, unpreferably involving the damage of the surface. When the common logarithm value is above 8 MPa, alternatively, cracks occur therein during heating molding or sack back (reversion of molding) occurs immediately after molding process, whereby no composite can be prepared, unpreferably.

Herein, the term "storage modulus in common logarithm within a temperature range higher by 20° C. to 100° C. than the glass transition temperature" of the molded article in the present Specification means the value of the storage modulus in common logarithm of the molded article within a temperature range of a temperature higher by 20° C. than the glass transition temperature to a temperature higher by 100° C. than the glass transition temperature, as measured by a dynamic visco-elasticity measuring system. The details are as described below in the following examples.

The thermoplastic resin molded article of the present invention has a cooling distortion ratio of 1.0 kg/cm$^2$·°C. or less when the molded article is cooled from 130° C. to 50° C., whereby the occurrence of distortion is suppressed in the thermoplastic resin molded article even when cooled after heating process of the article, involving less residual distortion and giving larger impact resistance to the resulting processed article. When the cooling distortion ratio of the thermoplastic resin molded article is above 1.0 kg/cm$^2$·°C., inner distortion develops or remains in processed articles produced by subjecting the thermoplastic resin molded article to heating process followed by cooling, leading to ready occurrence of the reduction of the impact resistance and to ready development of cracks or damage or distortion such as bending.

The term "cooling distortion ratio when cooled from 130° C. to 50° C." concerning the molded article in the present Specification means the value of the stress developing per 1° C. when the molded article is heated to a temperature of 130° C. and then cooled to a temperature of 50° C. according to ASTM D 638, and the details will be described in the following examples.

The thermoplastic resin molded article of the present invention can procure excellent impact resistance, when the molded article has an Izod impact strength of 2.0 kj/m$^2$ or more. When the Izod impact strength of the thermoplastic resin molded article is below 2.0 kj/m$^2$, the impact resistance of the thermoplastic resin molded article is so insufficient that the molded article may readily be damaged when the article is used as it is or is used for secondary processing, leading to the loss of the durability.

The term "Izod impact strength" of the molded article, referred to in the present Specification, means the Izod impact strength as measured according to JIS K 7110, and the details will be described in the following examples.

The thermoplastic resin molded article of the present invention is any thermoplastic resin molded article comprising a thermoplastic resin or a thermoplastic resin composition, which should satisfy the aforementioned individual requirements concerning the gloss of at least one surface, storage modulus in common logarithm, cooling distortion ratio and Izod impact strength. The type of thermoplastic resins composing the thermoplastic resin molded article, the type and composition of the thermoplastic resin compositions, and the method for producing the molded article (molding method) are not specifically limited. They are selected, depending on the utility of the molded article, the types of the thermoplastic resins and the thermoplastic resin composition, both composing the molded article, and the like.

Among them, the thermoplastic resin molded article satisfying the aforementioned requirements of the present invention can be produced smoothly by using a thermoplastic resin composition containing (A) polybutylene terephthalate resin, (B) polyethylene terephthalate resin, (C) (metha)acrylic resin, (D) polymer particle of multi-layer structure and (E) inorganic filler. As preferable embodiments, thus, the present invention encompasses the thermoplastic resin composition containing the component (A) to the component (E) and the thermoplastic resin molded article comprising the composition.

In accordance with the present invention, preferably, use is made of a thermoplastic resin composition containing (i) a polybutylene terephthalate resin and a polyethylene terephthalate resin at a weight ratio of 4:1 to 1:1, (ii) a (metha)acrylic resin at a ratio of 20 to 200 parts by weight to 100 parts by weight of the polybutylene terephthalate resin and the polyethylene terephthalate resin in total, (iii) a polymer particle of a multi-layer structure at a ratio of 10 to 100 parts by weight to 100 parts by weight of the polybutylene terephthalate resin, the polyethylene terephthalate resin and the (metha)acrylic resin in total, and (iv) an inorganic filler at a ratio of 10 to 40 parts by weight to 100 parts by weight of the thermoplastic resin composition, in particular.

When such thermoplastic resin composition containing the individual components at the specific ratios described above is used, a thermoplastic resin molded article and a processed article therefrom, both being of high quality with high-grade touch and having excellent heating processability with no occurrence of inner distortion during bending process under heating, excellent impact resistance with no occurrence of cracks or damage, and fine surface gloss, transparency and color tone, can be produced in an extremely smooth manner.

The polybutylene terephthalate resin and the polyethylene terephthalate resin in the thermoplastic resin composition make contributions to give good surface gloss, transparency and texture to the resulting thermoplastic resin molded article, with the resulting high-grade touch thereof.

In this case, the ratio of the polybutylene terephthalate resin and the polyethylene terephthalate resin in the thermoplastic resin composition is preferably a weight ratio of 4:1 to 1:1, more preferably a weight ratio of 3:1 to 5:2. If the ratio of the polybutylene terephthalate resin is above 80% by weight (if the ratio of the polyethylene terephthalate is below 20% by weight) on the basis of the total weight of the polybutylene terephthalate resin and the polyethylene terephthalate resin, the surface gloss of the resulting thermoplastic resin molded article is likely to be deteriorated; if the ratio of the polybutylene terephthalate resin is below 50% by weight (if the ratio of the polyethylene terephthalate is above 50% by weight) on the basis of the total weight of the polybutylene terephthalate resin and the polyethylene terephthalate resin, a heterogeneous part (fluctuation) develops on the surface of the thermoplastic resin molded article, possibly due to phase separation, leading to the loss of surface smoothness and the deterioration of surface gloss.

As the polybutylene terephthalate resin, in that case, use is made of a polybutylene terephthalate resin comprising a dicarboxylic acid unit primarily comprising terephthalic acid unit and a diol unit primarily comprising 1,4-butane diol unit. Representative examples of the polybutylene terephthalate resin include polybutylene terephthalate consisting of the terephthalic acid unit and 1,4-butane diol unit, with no specific limitation, and include any polybutylene terephthalate unit comprising other dicarboxylic acid units and/or other diol units, at 20 mol % or less to all the structural units, if necessary.

Other dicarboxylic acid units possibly contained in the polybutylene terephthalate resin include for example aromatic dicarboxylic acids such as isophthalic acid, phthalic acid, 2,6-naphthalane dicarboxylic acid, 1,5-naphthalene dicarboxylic acid, bis(p-carboxyphenyl)methane, anthracene dicarboxylic acid, 4,4'-diphenyl ether dicarboxylic acid, and sodium 5-sulfoisophthalate; aliphatic dicarboxylic acids such as adipic acid, sebacic acid, azelaic acid and dodecane dionic acid; alicyclic dicarboxylic acids such as 1,3-cyclohexane dicarboxylic acid and 1,4-cyclohexane dicarboxylic acid; and dicarboxylic acid units derived from ester-forming derivatives thereof (lower alkyl esters such as methyl ester and ethyl ester).

The polybutylene terephthalate resin may satisfactorily contain one of the dicarboxylic acid units or two or more thereof.

Additionally, other diol units possibly contained in the polybutylene terephthalate resin include for example aliphatic diols with 2 to 10 carbon atoms, such as ethylene glycol, propylene glycol, neopentyl glycol, 2-methylpropane diol, 1,5-pentane diol, cyclohexane dimethanol and cyclohexane diol; and diol units derived from polyalkylene glycols with a molecular weight of 6000 or less, such as diethylene glycol, polyethylene glycol, poly-1,3-propylene glycol, and polytetramethylene glycol. The polybutylene terephthalate resin may satisfactorily contain one of the aforementioned diol units or two or more thereof.

Furthermore, the polybutylene terephthalate resin may satisfactorily contain one or two or more of the structural units derived from trifunctional monomers for example glycerin, trimethylol propane, pentaerythritol, trimellitic acid and pyromellitic acid, at 1 mol % or less to all the structural units.

With no specific limitation, furthermore, the polybutylene terephthalate has an intrinsic viscosity within a range of 0.5 to 1.5 dl/g when the viscosity is measured in a solution of the resin in a mixture solvent of phenol/tetrachloroethane (weight ratio of 1/1), from the respect of obtaining a thermoplastic resin molded article with excellent mechanical properties such as mechanical strength, elastic modulus and impact resistance.

As the polybutylene terephthalate resin to be used together with the polybutylene terephthalate resin, additionally, use is made of polyethylene terephthalate comprising a dicarboxylic acid unit primarily comprising terephthalic acid unit and a polyethylene terephthalate resin comprising a diol unit primarily comprising ethylene glycol unit.

The polyethylene terephthalate resin representatively includes for example polyethylene terephthalate consisting of terephthalic acid unit and ethylene glycol unit, with no specific limitation, and further includes a polyethylene terephthalate resin comprising other dicarboxylic acid units and/or diol units, at 20 mol % or less to all the structural units, if necessary.

Examples of other dicarboxylic acid units possibly contained in the polyethylene terephthalate resin include the aforementioned other dicarboxylic acid units as described concerning the polybutylene terephthalate resin (A), while the polyethylene terephthalate resin (B) may possibly contain one or two or more of the other dicarboxylic acid units.

Examples of the other diol units possibly contained in the polyethylene terephthalate resin include 1,4-butane diol and the other diol units as described concerning about the polybutylene terephthalate resin, and the polyethylene terephthalate resin (B) may satisfactorily contain one or two or more of the other diol units described above.

Furthermore, if necessary, the polyethylene terephthalate resin may satisfactorily contain one or two or more of the structural units derived from trifunctional monomers, as described above concerning the polybutylene terephthalate resin.

With no specific limitation, furthermore, the polyethylene terephthalate resin has an intrinsic viscosity within a range of 0.5 to 1.5 dl/g when the viscosity is measured in a solution of the resin in a mixture solvent of phenol/tetrachloroethane (weight ratio of 1/1), from the respect of obtaining a thermoplastic resin molded article with excellent mechanical properties such as mechanical strength, elastic modulus and impact resistance.

Then, the (metha)acrylic resin to be used together with the polybutylene terephthalate resin and the polyethylene terephthalate resin makes contribution to the improvement of the heating processability of the resulting thermoplastic resin molded article.

The content of the (metha)acrylic resin in the thermoplastic resin composition is preferably 20 to 200 parts by weight, more preferably 30 to 100 parts by weight, to 100 parts by weight of the polybutylene terephthalate resin and polyethylene terephthalate resin in total, so as to adjust the common logarithm of the storage modulus within a temperature range higher by 20° C. to 100° C. than the glass transition temperature of the thermoplastic resin molded article to 7 to 8 MPa.

If the content of the (metha) acrylic resin is below 20 parts by weight as described above, the common logarithm of the storage modulus within a temperature range higher by 20° C. to 100° C. than the glass transition temperature of the thermoplastic resin molded article is readily departed from the range of 7 to 8 MPa, so that the heating processability of the thermoplastic resin molded article is likely to be deteriorated. If the content of the (metha)acrylic resin is above 200 parts by weight as described above, alternatively, a greater amount of an inorganic filler to be added so as to reduce the linear expansion coefficient of the resulting thermoplastic resin molded article is blended with so much difficulty that the linear expansion coefficient of the thermoplastic resin molded article is readily enlarged, while the surface smoothness and mechanical performance of the thermoplastic resin molded article is likely to be deteriorated.

As such (metha)acrylic resin, preferably, use is made of a (metha)acrylic resin primarily comprising a structural unit derived from methacrylate ester and containing a structural unit derived from acrylate ester and/or other unsaturated monomers, if necessary.

The methacrylate ester then includes methacrylate alkyl esters such as methyl methacrylate, ethyl methacrylate, propyl methacrylate, butyl methacrylate, pentyl methacrylate, hexyl methacrylate, cyclohexyl methacrylate, trimethylcyclohexyl methacrylate, and trifluoroethyl methacrylate; and methacrylate aromatic hydrocarbon esters such as phenyl methacrylate, fluorophenyl methacrylate, chlorophenyl methacrylate, bromophenyl methacrylate and benzyl methacrylate. The (metha)acrylic resin may satisfactorily contain a structure unit derived from one or two or more of the methacrylate esters described above.

From the respect of adjusting the common logarithm of the storage modulus of the resulting thermoplastic resin molded article to the range of 7 to 8 MPa, preferably, 80 mol % or more of the structural units composing the (metha)acrylic resin primarily comprise a structural unit derived from methyl methacrylate, among them.

If necessary, the (metha)acrylic resin may satisfactorily contain a structural unit derived from a small amount of acrylate ester (generally at 10 mol % or less of all the structural units). Examples of the acrylate ester then include acrylate alkyl esters such as methyl acrylate, ethyl acrylate, propyl acrylate, butyl acrylate, pentyl acrylate, hexyl acrylate, cyclohexyl acrylate, trimethylcyclohexyl acrylate, and trifluoroethyl acrylate; and acrylate aromatic hydrocarbon esters such as phenyl acrylate, fluorophenyl acrylate, chlorophenyl acrylate, bromophenyl acrylate and benzyl acrylate. The (metha)acrylic resin may satisfactorily contain a structure unit derived from one or two or more of the acrylate esters described above.

If necessary, the (metha)acrylic resin may satisfactorily contain a structural unit derived from a small amount of other unsaturated monomers (generally at 10 mol % or less of all the structural units). Examples of the other unsaturated monomers then include (metha)acrylic acid; metal salts of (metha)acrylic acid; vinyl chloride; vinyl acetate; acrylonitrile; acrylamide; styrene monomers such as styrene and α-methyl styrene; vinyl toluene; and maleic anhydride. The (metha)acrylic resin may satisfactorily contain a structural unit derived from one or two or more of these unsaturated monomers.

The (metha)acrylic resin has a viscosity average polymerization degree of preferably 500 to 1800, more preferably 800 to 1600. If used, the (metha)acrylic resin with the viscosity average polymerization degree adjusts the glass transition temperature of the thermoplastic resin composition, to improve the moldability of the thermoplastic resin composition, with no occurrence of any concave or convex on the surface of the resulting molded article or with no mold mark remaining on the surface of the molded article even after heating process, so that a processed article with good appearance can be obtained.

If the polymerization degree of the (metha)acrylic resin is too high, concave and covex readily develop on the surface of the thermoplastic resin molded article during the manufacturing process of the molded article, to induce such a tendency that the resulting molded article has poor appearance; if the polymerization degree is too low, the glass transition temperatures of the thermoplastic resin composition and the molded article comprising the same are decreased, which readily keeps the residue of the mold mark on the surface of the resulting processed article when the composition is processed under heating.

The polymer particle of a multi-layer structure, to be used in the thermoplastic resin composition of the present invention, makes contribution to the improvement of the impact resistance of the thermoplastic resin molded article, the reduction of the residual distortion in the resulting processed article processed from the thermoplastic resin molded article under heating, and the improvement of the impact resistance owing to the reduction.

The content of the polymer particle of a multi-layer structure in the thermoplastic resin composition is preferably 10 to 100 parts by weight, more preferably 20 to 50 parts by weight, to 100 parts by weight of the polybutylene terephthalate resin, polyethylene terephthalate resin and (metha) acrylic resin in total.

If the content of the polymer particle of a multi-layer structure is less than 10 parts by weight as described above, the cooling distortion ratio of the thermoplastic resin molded article is elevated to readily deteriorate the impact resistance; while the content is above 100 parts by weight, alternatively, the cooling distortion ratio of the thermoplastic resin molded article is lowered, although the mold mark is readily left on the surface of the thermoplastic resin molded article during heating process, thereby readily damaging the appearance of the processed article.

As the polymer particle of such multi-layer structure, use is made of a polymer particle of a multi-layer structure of two layers or three layers or more, where at least the outermost layer comprises a hard polymer layer and a rubber-type polymer layer is present inside. If used, such polymer particle of a multi-layer structure is homogeneously dispersed while keeping high compatibility with the thermoplastic resin composition and the molded article comprising the composition, so that the effect of improving the impact resistance can be exerted excellently.

With no specific limitation, the polymer particle of a multi-layer structure preferably used in accordance with the present invention includes for example a particle of a bilayer structure comprising a hard polymer layer (outermost layer)/rubber-type polymer layer (inner layer); a particle of a trilayer structure comprising a hard polymer layer (outermost layer)/rubber-type polymer layer (intermediate layer)/hard polymer layer (central layer); a trilayer particle comprising a hard polymer layer (outermost layer)/rubber-type polymer layer (intermediate layer)/rubber-type polymer layer (central layer); a trilayer particle comprising a hard polymer layer (outermost layer)/hard polymer layer (intermediate layer)/rubber-type polymer layer (central layer); and a four-layer particle comprising a hard polymer layer (outermost layer)/rubber-type polymer layer (intermediate layer)/hard polymer layer (intermediate layer)/rubber-type polymer layer (central layer).

The hard polymer layer composing the outermost layer in the polymer particle of a multi-layer structure preferably comprises a polymer of a glass transition temperature of 25° C. or more and an elastic modulus of $10^8$ MPa. The rubber polymer layer present in the inside of the polymer particle of the multi-layer structure preferably comprises a polymer of a glass transition temperature of 25° C. or less.

The hard polymer composing the hard polymer layer in the polymer particle of a multi-layer structure preferably belongs to esters of chain alkyls or cyclic alkyls of methacrylic acid, such as methyl methacrylate, ethyl methacrylate, cyclohexyl methacrylate, and isobutyl methacrylate; aromatic hydrocarbon esters of methacrylic acid, such as phenyl methacrylate; aromatic vinyl compounds such as styrene and α-methyl styrene; and polymers produced by polymerizing one or two or more of unsaturated monomers such as acrylonitrile; the hard polymer is more preferably a polymer primarily comprising methyl methacrylate and/or styrene.

The rubber-type polymer composing the rubber-type polymer layer in the polymer particle of a multi-layer structure is any polymer with a glass transition temperature of 25° C. or less and with rubber elasticity, with no specific limitation, and the rubber-type polymer includes for example conjugated diene polymers such as polybutadiene, polyisoprene, butadiene-isoprene copolymer, polychloroprene, styrene-butadiene copolymer, acrylonitrile-butadiene copolymer, and acrylate ester-butadiene copolymer; hydrogenated products of the diene polymer; olefin rubber such as ethylene-propylene copolymer, ester-propylene-diene copolymer, ethylene-vinyl acetate copolymer rubber, polyisobutylene rubber; acrylic rubber; silicon rubber; fluoride rubber; thermoplastic elastomers such as polyurethane elastomer, polyester elastomer, and polyamide elastomer. The rubber-type polymer layer in the polymer particle of a multi-layer structure may comprise one or two or more of these rubber-type polymers. The rubber-type polymer layer preferably comprises acrylic rubber, conjugated diene polymer and/or the hydrogenated products of the conjugated diene polymer, among them.

The rubber-type polymer layer in the polymer particle of a multi-layer structure is preferably in a cross-linked molecular structure, from the respect of exerting the rubber elasticity in a wide temperature range. Additionally, one rubber-type polymer layer is chemically bonded to hard-type polymer layers or other rubber-type polymer layers, adjacent to the rubber-type polymer layer.

The particle size of the polymer particle of a multi-layer structure is generally about 0.05 to 1 μm as the average particle size, with no specific limitation, which is preferable from the respect of effectively improving the dispersibility in the thermoplastic resin composition and the impact resistance of the thermoplastic resin molded article and the homogeneity of the surface.

From the respect of the dispersibility in the thermoplastic resin composition and the thermoplastic resin molded article and the effect on the exertion of the impact resistance and the extrusion stability, preferably, the ratio of the hard-type polymer layer in the polymer particle of a multi-layer structure is about 5 to 50% by weight while the ratio of the rubber-type polymer layer in the polymer particle of a multi-layer structure is about 50 to 95% by weight.

The inorganic filler to be used in the thermoplastic resin composition in accordance with the present invention works to reduce the linear expansion ratio of the thermoplastic resin molded article, thereby contributing to the reduction of the cooling distortion ratio of the thermoplastic resin molded article during heating process, to improve the impact resistance of the processed article. Furthermore, the inorganic filler contributes to the reduction of bending which readily develops in simultaneously carrying out the heating process of the thermoplastic resin molded article and the adhesion process thereof to other materials such as composite board.

As described above, the content of the inorganic filler in the thermoplastic resin composition is preferably 10 to 40 parts by weight, more preferably 20 to 30 parts by weight to 100 parts by weight of the thermoplastic resin composition (100 parts by weight of the thermoplastic resin composition including the inorganic filler). If the content of the inorganic filler is less than 10 parts by weight, the processed article produced by processing under heating the thermoplastic resin molded article bends, to cause difficulty in preparing composite materials thereof with other materials or to readily deteriorate the impact resistance. If the content of the inorganic filler is above 40 parts by weight, the rigidity of the thermoplastic resin molded article is elevated to readily deteriorate the impact resistance in the same manner.

As such inorganic filler, preferably, use is made of inorganic fillers with refractive indices close to the refractive index (generally about 1.51 to 1.56) of a mixture of the polybutylene terephthalate resin, polyethylene terephthalate resin and (metha)acrylic resin.

Furthermore, the inorganic filler is preferably of Moose hardness of 4 or less. By using an inorganic filler with Moose hardness of 4 or less, scratching and wear of for example the inner wall of melt kneading systems or devices such as screw can be prevented, when the inorganic filler and the polymer particle of a multi-layer structure are mixed into the resin material, followed by melt kneading with an extruder, thus leading to the prolongation of the system life; additionally, metal powders generated through the scratching and wear of the devices are never contaminated into the resulting thermoplastic resin molded article, thereby improving the color tone of the resulting thermoplastic resin molded article; when intending to color and produce a thermoplastic resin molded article by adding and mixing a dye or pigment into the resin composition, for example, such coloring can be done freely and vividly, and additionally, the deterioration of the thermoplastic resin molded article with the metal powder can be prevented.

From the respect of the dispersibility into the resin and the surface smoothness and mechanical properties of the resulting thermoplastic resin molded article, furthermore, the inorganic filler has an average particle size of 1 to 10 $\mu$m, preferably. If the average particle size of the inorganic filler is below 1 $\mu$m, the dispersibility thereof into the resin is reduced, to readily deteriorate the surface smoothness of the resulting thermoplastic resin molded article and mechanical properties thereof such as bending strength; while the average particle size is above 10 $\mu$m, alternatively, the gloss of the thermoplastic resin molded article is so much reduced that the resulting thermoplastic resin molded article cannot procure high-grade touch.

In accordance with the present invention, any inorganic filler satisfying the conditions described above may preferably be used; representative examples of the inorganic filler preferable for use include calcium carbonate, magnesium hydroxide, amorphous silica, talc and clay, and these inorganic fillers may be used singly or in combination of two or more thereof.

In accordance with the present invention, if necessary, use is further made of one or two or more of organic and/or inorganic dyes and pigments, mica of a particle size of about 10 to 50 $\mu$m, powdery particles of natural stone, glass flake, and cross-linked synthetic resin powder, within a range with no damage on the objects or effects of the present invention.

In accordance with the present invention, if necessary, use is still further made of one or two or more of anti-fungus agents, mildewproofing agents, antioxidants, preventive agents against thermal degradation, light stabilizers, ultraviolet light absorber, fire retardant additives, fire retardant auxiliary agents, reinforcing agents, crystallization propagating agents, terminal sealing agents, release agents, antistatic additives, hydrolysis preventing agents, adhesion auxiliary agents, and tackifier, within a range with no suppression on the effects of the present invention.

So as to produce the thermoplastic resin composition of the present invention by using the polybutylene terephthalate resin, the polyethylene terephthalate resin, the (metha) acrylic resin, the polymer particle of a multi-layer structure, the inorganic filler and optional other components, the production method thereof is not specifically limited. Any method capable of uniformly mixing the aforementioned components together may satisfactorily be used. By way of illustration with no specific limitation, the polybutylene terephthalate resin, the polyethylene terephthalate resin, the (metha)acrylic resin, the polymer particle of a multi-layer structure, the inorganic filler and optional other components are preliminarily mixed together at their given ratios, by using a mixer (for example, high-speed mixer) of a longitudinal type or a crosswise type for routine use for polymer mixing, and by subsequently melt kneading the resulting mixture under heating in a batch-wise manner or in a continuous manner by using a single-screw extruder or a twin-screw extruder, a mixing roll or Banbury mixer, the thermoplastic resin composition of the present invention can be prepared. The melt kneading process is then preferably carried out generally at a temperature of about 240° C. to 285° C. The thermoplastic resin composition thus produced may further be prepared as pellets or other forms, if necessary.

For producing the thermoplastic resin molded article by using the thermoplastic resin composition, the composition is molded by employing molding methods and molding systems for general use for thermoplastic resins and compositions thereof. For example, the composition is prepared into a variety of molded articles by extrusion molding, injection molding, blow molding, calender molding, casting, press molding and the like. The thermoplastic resin molded article of the present invention may have any shape, structure or dimension, with no specific limitation, which is determined, depending on the purpose and utilities thereof for use. The thermoplastic resin molded article thus produced may be used as it is or may be prepared through secondary molding or processing, such as bending process, compression molding, and vacuum molding.

Specifically, the thermoplastic resin molded article of the present invention, satisfying the aforementioned properties including 80% or more gloss of at least one surface, a storage modulus of 7 to 8 MPa in common logarithm within a temperature range higher by 20° C. to 100° C. than the glass transition temperature, a cooling distortion ratio of 1.0 kg/cm$^2$·°C. or less when the article is cooled from a temperature of 130° C. to a temperature of 50° C., and an Izod impact strength of 2.0 kJ/m$^2$ or more, and the thermoplastic resin molded article of a board shape in particular has excellent heating processability, specifically excellent bending processability under heating. Therefore, the article has so low residual distortion due to cooling when the article is heating processed that processed articles with excellent mechanical properties such as impact resistance can be prepared from the article. By actively utilizing such properties, the article can be used effectively for housing interior materials and equipment, such as the top boards, doors and walls of system kitchens, the top boards of dressing and washing units, the side walls and aprons of unit baths and the counters of bay windows.

By using the thermoplastic resin composition containing the polybutylene terephthalate resin, the polyethylene terephthalate resin, the (metha)acrylic resin, the polymer particle of a multi-layer structure, the inorganic filler and optional other components, in accordance with the present invention, molded articles of for example board shapes can be produced in a smooth manner at a high productivity by extrusion molding.

The extrusion molding method and extrusion molding systems therefor are not specifically limited, and any extrusion molding method and any extrusion molding system conventionally used for thermoplastic resins and compositions thereof may satisfactorily be used. Byway of illustration with no specific limitation, the thermoplastic resin composition is melt kneaded at a cylinder temperature of 240 to 280° C. by using a single-screw extruder with I die, T die, or coat hanger die arranged on the head part, and then, the melt resin composition is introduced into a die preset to a temperature of about 255 to 265° C., which then flows out from the die. Then, the melt resin composition flowing out is cooled through vertically or horizontally arranged multiple nip rolls, whereby a thermoplastic resin molded article of a board shape can be produced at a high productivity.

When the thermoplastic resin molded article of the present invention is of a board shape, the heat conductivity of the article is improved when the board thickness thereof is 3 mm or less, which enables uniform heating thereof during bending process, leading to further reduction of the inner residual distortion in the bending processed article involving the improvement of the impact resistance, whereby the occurrence of cracks or damage at the bending processed part or therearound can be prevented, still more excellently.

For subjecting the thermoplastic resin molded article of the present invention to heating process such as bending process, the thermoplastic resin molded article may singly be subjected to heating process or may be subjected, in combination with composite boards, calcium silicate boards, slate boards, steel boards of a thickness of 2 mm or less, and other materials, to heating process under heating, to prepare a composite product. For subjecting the thermoplastic resin molded article of the present invention to heating process, the heating process of the molded article may be carried out concurrently with the adhesion of the molded article to composite boards or other materials.

EXAMPLES

The present invention will now be described more specifically in the following examples, but the present invention is not limited to these examples. In the following examples, the surface gloss of the thermoplastic resin molded article (thermoplastic resin molded article of a board shape), the storage modulus thereof in common logarithm within a temperature range higher by 20° C. to 100° C. than the glass transition temperature, the cooling distortion ratio of the molded article when cooled from 130° C. to 50° C., and the Izod impact strength thereof were determined as follows.

[Surface gloss of thermoplastic resin molded articles]

Thermoplastic resin molded articles of board shapes, produced in the following examples and comparative examples, were cut with a running saw, to prepare test pieces (each of 50-mm length×50-mm width×1.2-mm thickness) and measure the 60° specular surface gloss (%) of one surface of these test pieces by using a digital varied-angle gloss meter ("UGV-D" manufactured by Suga Testing Machine Industry, Co. Ltd.) according to JIS K 7105.

[Storage modulus in common logarithm of thermoplastic resin molded articles]

1. The thermoplastic resin molded articles of board shapes, produced in the following examples and comparative examples, were cut with a running saw, to prepare test pieces (each of 8-mm length×50-mm width×1.2-mm thickness), and by subsequently using a dynamic visco-elasticity analyzer ("PL-DMTA" manufactured by Polymer Laboratories, Co. Ltd.), a bending stress on a sine curve was applied to the center parts of the test pieces along the longitudinal direction while raising the temperature under the following conditions, to measure the sine loss as a temperature function on the basis of the ratio of the phase outer stress component to the distortion vibration and read the storage modulus within a temperature range higher by 20° C. to 100° C. than the glass transition temperature defined as the αdispersion peak temperature of the loss modulus. Then, the common logarithm of the storage modulus was determined and designated as the storage modulus in common logarithm of the thermoplastic resin molded articles.

Conditions for measurement
Frequency for measurement; 1 Hz
Dynamic distortion; 32 μm
Mode for measurement; Dual Cantilever beam
Drive clamp; Knife Edge of 5-mm width
Flame length; 16 mm
Temperature for measurement; 30 to 250° C.
Temperature elevation conditions; 3° C./min.

[Cooling distortion ratio of thermoplastic resin molded articles]

From the thermoplastic resin molded articles of board shapes, produced in the following examples or comparative examples, test pieces of dumbbell shapes were prepared, according to Type-1 of ASTM-D 638, to measure cooling distortion of the test pieces by using a tensile tester for measuring cooling distortion. As the tensile tester, use was made of Autograph AGS 100 G-2000B manufactured by Shimadzu Corporation, preliminarily equipped with a thermostat, a 100 kgf load cell and a tensile device; the test pieces were fixed on the sample fixing part of the upper part of the tensile device, to preliminarily heat the test pieces to a temperature of 130° C.; thereafter, the lower part each of the test pieces was fixed on the sample fixing part of the lower part of the tensile device, followed by heating the pieces for 5 minutes after the door of the thermostat was closed, until the temperature of each test piece in its entirety was at 130° C. Then, each of the test pieces fixed at the sample fixing part on the upper part and at the sample fixing part on the lower part at an interval of 100 mm, were elongated by 10% at a crosshead speed of 100 mm/min, and each test piece was retained at that state at a temperature 130° C. for another one minute. Subsequently, the stress generating during the temperature decrease of the thermostat at a rate of 1° C./5 min to 50° C. was read on the basis of the load value on the load cell arranged at the sample fixing part on the upper part, to determine the cooling distortion ratio of the test pieces (thermoplastic resin molded articles) by the following formula, when the test pieces were cooled from a temperature 130° C. to a temperature 50° C.

Cooling distortion ratio (kg/cm$^2$·°C.)=($W_{130}$−$W_{50}$)/(130° C.−50° C.)

wherein
$W_{130}$=load value (kg/cm$^2$) on the load cell at a temperature of 130° C.;
$W_{50}$=load value (kg/cm$^2$) on the load cell at a temperature of 50° C.

[Izod impact strength of thermoplastic resin molded articles]

Notched Izod impact strength of the thermoplastic resin molded articles of board shapes as produced in the following examples or comparative examples was determined at 23° C. by using an Izod impact strength tester (manufactured by Toyo Seiki Corporation) according to JIS K 7110.

Composite bodies were produced from the thermoplastic resin molded articles of board shapes (resin boards) and composite boards (lining materials) by the following method, to determine the falling ball impact strength and bending of the composite bodies and the linear expansion coefficients of the molded articles, as described hereinbelow.

[Preparation of composite bodies of resin boards and composite boards]

Figure 3E:
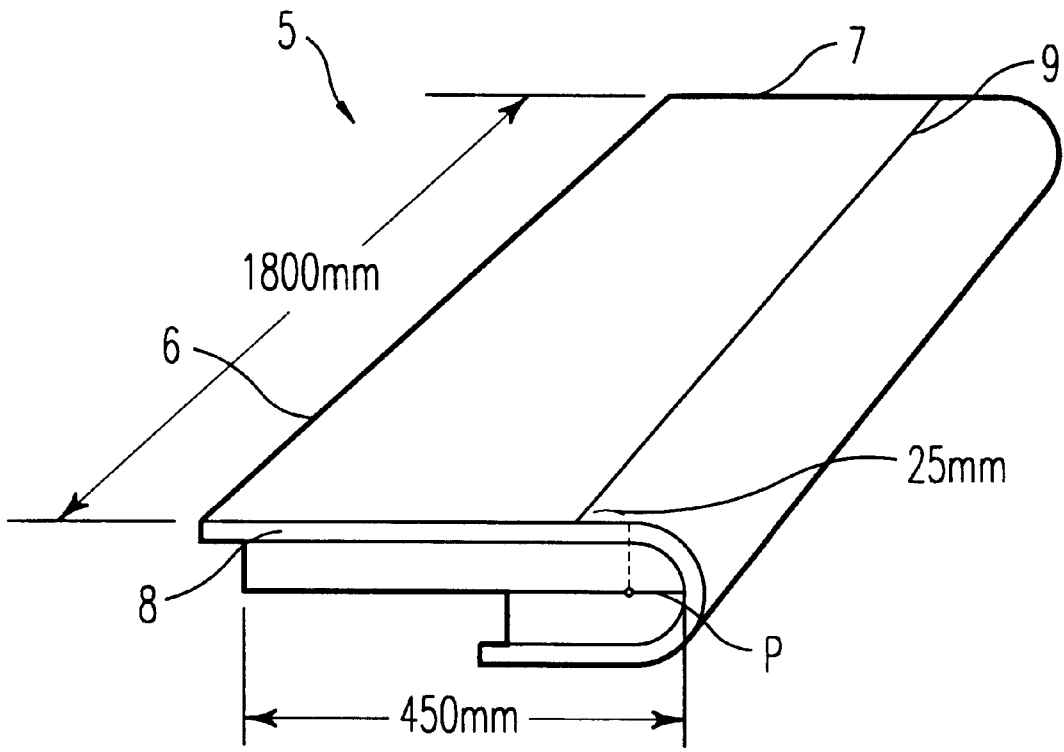
FIG. 3 depicts a view of the resulting composite materials.
1. Processed board
2. Processed board
3. Lining material
4. Resin board
5. Composite material
6. Longer side
7. Shorter side
8. Shorter side
9. wire.

The method for producing the composite bodies will now be described below with reference to FIG. 1, FIG. 2, and FIG. 3.

1. Preparation of lining materials

From a completely water-resistant composite board of 1800-mm width×18-mm thickness (Type-1 Composite Board, manufactured by Yuasa), two boards, namely a board of 450-mm length×1800-mm width and a board of 50-mm length×1800-mm width, were cut out by using a disc saw. By using a planer, one longitudinal side area of each wood board was processed into a curved area of a curvature radius (R) of 18 mm, to prepare processed board 1 and processed board 2, with one longitudinal side area having the circumference of a ¼ circle, as shown in FIG. 1A and FIG. 1B.

Figure 1C:
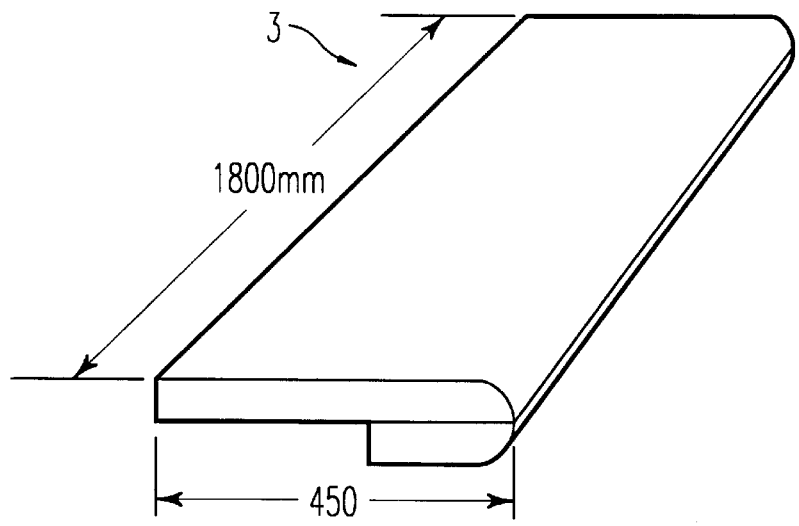

So as to prepare longitudinal side areas having the circumference of a ½ circle, an adhesive (vinyl acetate emulsion adhesive of Type CH-18 manufactured by Konishi, Co. Ltd.) was coated on the surfaces opposing to the longitudinal side areas treated with curvature processing of the processed boards 1 and 2, and while the two coated surfaces were kept in contact to each other, the surfaces were bonded together under pressure, to prepare lining material 3 as shown in FIG. 1C, of which one side along the longitudinal direction was of a curved area with the circumference of a ½ circle with a curvature radius (R) of 18 mm.

2. Adhesion of resin boards to lining materials

From the thermoplastic resin molded articles of board shape, as produced in the following examples or comparative examples, resin board 4 of 540-mm length×1800-mm width, was cut out. After spray coating a solvent-type rubber adhesive (Hibon 1887; manufactured by Hitachi Chemical Co.) on the adhesive surfaces of the resin board 4 and the lining material 3, then, the board and the material were dried in air for 15 to 30 minutes to evaporate the solvent contained in the adhesive. As shown in FIG. 2(a), subsequently, the resin board 4 and the lining material 3 were laminated together, while keeping the resin board 4 more or less extruded from the end part of the longitudinal side area of the lining material 3 with no curvature treatment, for subsequent adhesion at the plane part at a pressure of 5 kg/cm².

3. Bending process under heating

By using a post-form molding machine ("PE10/42" manufactured by Brandt, Co.) of an iron vendor type, the lamination board produced above in 2. was placed and fixed on the table of the molding machine, while the resin board 4 was on top. By selecting the temperature of the heater bar of the molding machine and the contact time of the heater bar to the resin board 4 so that the temperature of the resin board might be 125 to 145° C., the heater bar was firstly put in contact through synthetic paper (not shown in the figure) to the face of the resin board 3, by using an air cylinder equipped to the heater bar, under the aforementioned conditions, to transfer the heater bar along the curved area of the lining material 3 to the lower face (part into which the bar is to be circulated), as shown in FIGS. 2(b) to (d), to simultaneously carry out the bending process of the end part of the resin board 4 and the adhesion process of the resin board 4 to the lining material 3 and prepare composite body 5 of the resin board 4 and the lining material 3 (composite board), as shown in FIG. 3.

[Falling ball impact strength]

Using the composite body 5 recovered above, falling ball impact test was carried out according to JIS K 7211 and JIS A 4401. More specifically, by using a bar•falling ball release system (manufactured by Toyo Seiki Corporation), falling ball impact tests of spherical falling balls of mass weights of 28.1 g, 500 g and 1000 g were carried out by changing the height for falling these balls. As to the test of the top board part (resin board) of the composite body, then, a falling ball was fallen while the resin board side of the composite body 5 was on top of wood (specific gravity of 0.7 or more and thickness of 3 cm) placed on smooth concrete floor. As to the test of the curvature processed part (R part) of the composite body 5, additionally, a falling ball was vertically fallen down on the curvature processed part (R part) of the composite body 5 while the longer side 6 of the composite body 5 was vertically arranged in contact to the concrete floor.

The maximum of the product of the mass weight in kg of a falling ball with no damage on the composite body 5 and the falling height (c) was defined as the falling ball impact strength (kg•cm).

[Bending of composite body]

While vertically supporting and standing the composite body 5 with the longer side 6 in contact to the floor with no loading of excessive extraneous force on the composite body 5, stainless steel wire 9 (of a diameter of 0.2 mm) was horizontally stretched from one shorter side 7 of the composite body 5 to the other shorter side 8 thereof at a position 25-mm inside center P of the bending processed part, to measure the dimension (D) of the maximum gap generated between the plane surface of the composite body 5 and the wire 9 by means of a gap gage.

In the same manner, wire 9 was also stretched over the lining material 3, prior to adhesion to the resin board 4, to preliminarily measure the maximum gap gage (C) generated between the wire 9 and the plane surface of the lining material 3 and subsequently determine the bending of the composite body 5 by the following formula;

Bending (mm) of composite body=D (mm)−C (mm).

[Linear expansion coefficients of resin boards]

Linear expansion coefficients of resin boards were determined on the basis of the data of a second run at a basal temperature of 30 to 80° C., by using a thermal analyzer (TMA 4000 of System 001) manufactured by Mac Science Co. according to ASTM D 696 under the following conditions.

Conditions

Constant load; 10 g

Temperature elevation rate; 30° C./min

Cycle; temperature elevation from room temperature to 200° C., cooling to room temperature and temperature elevation from room temperature to 200° C. [2nd run].

Synthetic Example 1

Production of polybutylene terephthalate 88 parts by weight of dimethyl terephthalate, 49 parts by weight of 1,4-butane diol and 0.0035 part by weight of tetraisopropyl titanate were charged into a reaction tank, followed by gradual elevation of the temperature from 170° C. to 230° C. at ambient pressure for ester exchange reaction, until 28 parts by weight of methanol flew out. By elevating the temperature from 230° C. to 250° C. while lowering the pressure to 0.2 mmHg, just then, the resulting mixture was retained at that state for about 2 hours for condensation polymerization. Subsequently, nitrogen gas was fed into the reaction tank, which could thereby resume ambient pressure, to terminate the reaction, whereby polybutylene terephthalate with an intrinsic viscosity of 1.15 dl/g, as measured in a phenol/tetrachloroethane mixture solvent (1/1 weight ratio), was recovered (referred to as "PBT-1" hereinbelow).

Synthetic Example 2
Production of polybutylene terephthalate 100 parts by weight of dimethyl terephthalate, 60 parts by weight of 1,4-butane diol and 0.004 part by weight of tetraisopropyl titanate were charged into a reaction tank, followed by gradual elevation of the temperature from 145° C. to 230° C. at ambient pressure for ester exchange reaction, until 26 parts by weight of methanol flew out. By elevating the temperature to 240° C. while lowering the pressure to 0.2 mmHg, just then, the resulting mixture was retained at that state for about 1.5 hours for condensation polymerization. Subsequently, nitrogen gas was fed into the reaction tank, which could thereby resume ambient pressure, to terminate the reaction, whereby polybutylene terephthalate with an intrinsic viscosity of 0.90 dl/g, as measured in a phenol/tetrachloroethane mixture solvent (1/1 weight ratio), was recovered (referred to as "PBT-2" hereinbelow).

Synthetic Example 3
Production of polyethylene terephthalate 97 parts by weight of dimethyl terephthalate, 64 parts by weight of ethylene glycol, and 0.03 part by weight of manganese acetate were charged into a reaction tank, followed by gradual elevation of the temperature from 140° C. to 230° C. at ambient pressure for ester exchange reaction, until 28 parts by weight of methanol flew out. Just then, 0.04 part by weight of antimony trioxide was added into the resulting mixture. When 32 parts by weight of methanol flew out in total, 0.02 part by weight of trimethyl phosphate was added into the reaction mixture to terminate the ester exchange reaction. By elevating the temperature to 280° C. while lowering the pressure inside the reaction tank to 0.2 mmHg, then, the resulting mixture was retained at that state for about 3 hours for condensation polymerization. Subsequently, nitrogen gas was fed into the reaction tank, which could thereby resume ambient pressure to terminate the reaction, whereby polyethylene terephthalate with an intrinsic viscosity of 0.60 dl/g, as measured in a phenol/tetrachloroethane mixture solvent (1/1 weight ratio), was recovered (referred to as "PET" hereinbelow).

Production Example 1
Production of polymer particle of multi-layer structure

1. Into a polymerization reactor equipped with an agitator, a cooling tube and a dropwise addition funnel were charged 600 parts by weight of distilled water, 0.168 part by weight of sodium laurylsarcosinate, and 2.1 parts by weight of sodium stearate in nitrogen atmosphere, followed by heating at 70° C. for dissolution. Subsequently, 150 parts by weight of butyl acrylate and 0.15 part by weight of allyl methacrylate were charged into the resulting mixture, prior to agitation for 30 minutes. Subsequently, 0.15 part by weight of potassium peroxydisulfide was added into the resulting mixture to initiate polymerization. Four hours later, it was confirmed by gas chromatography that all the monomers were consumed to generate a copolymer of butyl acrylate and allyl methacrylate in the polymerization reactor.

2. Subsequently, 0.15 part by weight of potassium peroxydisulfide was added into the reactor containing the copolymer, followed by dropwise addition of a mixture of 48 parts by weight of methyl methacrylate and 2.0 parts by weight of ethyl acrylate from the dropwise addition funnel over 2 hours, for subsequent polymerization reaction for 30 minutes, to recover a latex containing a polymer particle of an average particle size of 0.3 μm and of a multi-layer structure.

3. After aggregating together the latex, recovered above in 2, at −20° C. for 24 hours, the aggregate was drawn out and rinsed in hot water at 80° C. three times, followed by drying at 80° C. at a reduced pressure for 2 days, to recover a polymer particle of a multi-layer structure. The glass transition temperature of the outermost layer of the polymer particle of the multi-layer structure thus recovered was 105° C.

The acrylic resins and inorganic fillers used in the following examples and comparative examples will be described below.

Acrylic resin No.1
Copolymer of 94% by weight of methyl methacrylate and 6% by weight of methyl acrylate [polymerization degree of 1300 and melt flow index of 15.1/10 min (ASTM D1238 condition 1)].

Acrylic resin No.2
Copolymer of 88% by weight of methyl methacrylate and 12% by weight of methyl acrylate [polymerization degree of 1600 and melt flow index of 3.3/10 min (ASTM D1238 condition 1)].

Inorganic fillers
1. Calcium carbonate ("Whiten P-30" manufactured by Shiraishi Industrial Company)
2. Talc ("Micron White #2000 S" manufactured by Hayashi Chemical Industry)

Example 1
1. The polybutylene terephthalate produced in the Synthetic Example 1 or 2, the polyethylene terephthalate produced in the Synthetic Example 3, the acrylic resin No.1 or 2 described above, the polymer particle of a multi-layer structure as produced in the Production Example 1, and the inorganic fillers described above were preliminarily mixed together at ratios shown in Table 1 or 2, by using a high-speed rotary mixer ("Super Mixer" manufactured by Kawada Seisakusho, Co. Ltd.), and the resulting mixture was fed into a twin-screw extruder with the screws rotating in the same direction (Type "BT-40" manufactured by Nippon Industry, Co. Ltd.) for melt kneading under conditions of a cylinder temperature of 260° C. and a screw rotation number of 150 rpm, which was then extruded from a die at a temperature of 270° C. in a strand form into a water tank at a water temperature of 35° C., until the strand temperature reached 60° C. The strand was cut under elongation with a rotation blade cutter, to prepare a thermoplastic resin composition in pellets (diameter of 3 mm and length of 3.5 mm).

2. The pellets of the thermoplastic resin composition thus recovered were fed into a system for producing board bodies, the system comprising a vent-equipped single-screw extruder (manufactured by Toshiba Machine, Co., Ltd.), a coat hanger die (width of 1000 mm), a polishing roll (belt driving type by means of longitudinal three cooling rolls) and a draw machine (also working for bonding masking materials), for molding the pellets under conditions as follows; a temperature of 288° C. of the cylinder at the field part of the extruder; a temperature of other cylinders at 265° C.; a screw rotation number of 100 rpm; a die temperature of 260° C.; a die lip opening of 2.5 mm; the distance between the die and a first roll being 100 mm; polishing roll temperatures including an upper roll temperature of 80° C., an intermediate roll temperature of 90° C. and a lower roll temperature of 70° C., and a line speed of 1.84 m/min. Thus, a thermoplastic resin molded article of a board shape of a 1.2-mm thickness and a 85-mm width was prepared.

3. By the methods described above, the surface gloss of the thermoplastic resin molded article of a board shape as recovered above in 2, the storage modulus in common logarithm within a temperature range higher by 20° C. to 100° C. than the glass transition temperature, the cooling distortion ratio when cooled from a temperature 130° C. to a temperature 50° C., and the Izod impact strength were measured, as shown in Table 1 or 2.

The falling ball impact strength, linear expansion coefficient and bending of the composite body 5 produced by using the thermoplastic resin molded article of a board shape (resin board) as recovered above in 2, were measured by the methods described above, as shown in Table 1 or 2.

4. For reference, additionally, the surface gloss, storage modulus in common logarithm, cooling distortion ratio, Izod impact strength, falling ball impact strength, linear expansion coefficient and bending of commercially available melamine board, artificial marble of a cross-linked type methacrylic resin and artificial marble of an unsaturated polyester resin, were measured in the same manner as described above, which are shown in Table 2.

TABLE 1

| | Experimental No. | | | | | |
|---|---|---|---|---|---|---|
| | 1 | 2 | 3 | 4 | 5 | 6 |
| [Thermoplastic resin composition (parts by weight)] | | | | | | |
| PBT-1 | 30.7 | | 15.4 | 21.3 | 25.0 | 18.8 |
| PBT-2 | | 30.7 | | | | |
| PET | 15.4 | 15.4 | 15.4 | 21.3 | 12.5 | 18.8 |
| Acrylic resin No. 1 | 15.4 | | 30.7 | 14.3 | 12.5 | 37.4 |
| Acrylic resin No. 2 | | 15.4 | | | | |
| Polymer particle of multi-layer structure | 15.4 | 15.4 | 15.4 | 20.0 | 15.0 | 15.0 |
| Inorganic filler | | | | | | |
| Calcium carbonate | 23.1 | | 23.1 | 23.1 | 35.0 | 10.0 |
| Talc | | 23.1 | | | | |

TABLE 1-continued

| | Experimental No. | | | | | |
|---|---|---|---|---|---|---|
| | 1 | 2 | 3 | 4 | 5 | 6 |
| [Properties of resin molded article (resin board)] | | | | | | |
| Surface gloss (%) | 83 | 81 | 82 | 84 | 81 | 85 |
| Storage modulus in common logarithm (Mpa) | 7.5–8 | 7.5–8 | 7.5–8 | 7.5–8 | 7.5–8 | 7–7.5 |
| Cooling distortion ratio (kg/cm$^2$ · ° C.) | 0.7 | 0.8 | 0.9 | 0.7 | 1.0 | 0.8 |
| Izod impact strength (kj/m$^2$) | 3.1 | 2.8 | 2.0 | 3.5 | 2.0 | 3.5 |
| Linear expansion coefficient (cm$^2$ · ° C./° C. × 10$^5$) | 0.8 | 0.9 | 0.8 | 0.9 | 0.8 | 0.9 |
| [Properties of composite body] | | | | | | |
| Heating time during bending process (seconds) | 30 | 35 | 25 | 25 | 35 | 25 |
| Falling ball impact strength (kg · cm) | | | | | | |
| Bending processed part | 110.0 | 100.0 | 80.0 | 120.0 | 80.0 | 100.0 |
| Top board part | 110.0 | 100.0 | 80.0 | 120.0 | 80.0 | 100.0 |
| Bending (mm) | 0.5 | 0.7 | 1.0 | 0.3 | 0.8 | 0.9 |

TABLE 2

| | Experimental No. | | | | | |
|---|---|---|---|---|---|---|
| | 7 | 8 | 9 | 10 | 11 | 12 |
| [Thermoplastic resin composition (parts by weight)] | | | | | | |
| PBT-1 | 15.4 | 37.6 | 24.0 | Mela-mine decorating board | Artificial marble[1] | Artificial marble[2] |
| PBT-2 | | | | | | |
| PET | 30.7 | 18.9 | 12.0 | | | |
| Acrylic resin No. 1 | 15.4 | 15.4 | 12.0 | | | |
| Polymer particle of multi-layer structure | 15.4 | 5.0 | 12.0 | | | |
| Inorganic filler | | | | | | |
| Calcium carbonate | 23.1 | 23.1 | 40.0 | | | |
| [Properties of resin molded article (resin board)] | | | | | | |

TABLE 2-continued

| | Experimental No. | | | | | |
|---|---|---|---|---|---|---|
| | 7 | 8 | 9 | 10 | 11 | 12 |
| Surface gloss (%) | 55 | 80 | 80 | 18 | 85 | 9.5 |
| Storage modulus in common logarithm (Mpa) | 7.5–8 | 7.3–8.3 | 8–8.5 | 8.5–9.3 | 7–7.3 | 7.5–8 |
| Cooling distortion ratio (kg/cm² · °C.) | 0.9 | 1.3 | 1.5 | 1.7 | 1.8 | 1.0 |
| Izod impact strength (kj/m²) | 3.1 | 1.5 | 1.2 | 3.1 | 1.3 | 4.0 |
| Linear expansion coefficient (cm² · °C./°C. × 10⁵) | 1.0 | 1.2 | 0.9 | —[3] | 0.8 | 0.8 |
| [Properties of composite body] | | | | | | |
| Heating time during bending process (seconds) | 40 | 45 | 60 | 70 | 250 | —[4] |
| Falling ball impact strength (kg · cm) | | | | | | |
| Bending processed part | 95.0 | 50.0 | 30.0 | 0.9 | 2.5 | —[4] |
| Top board part | 95.0 | 65.0 | 50.0 | 19.0 | 62.0 | —[4] |
| Bending (mm) | 1.5 | 2.0 | 2.5 | 2.0 | 5.0 | —[4] |

[1] Artificial marble of cross-linked acrylic resin (commercially available)
[2] Artificial marble of unsaturated polyester resin (commercially available)
[3] not measurable (hardening and shrinkage occur thermally)
[4] not measured.

Comparative Example 1

Various properties were measured in the same manner as in Example 1, except that the ratios of the polybutylene terephthalate produced in the Synthetic Example 1 or 2, the polyethylene terephthalate produced in the Synthetic Example 3, the acrylic resin No.1 or 2 described above, the polymer particle of a multi-layer structure as produced in the Production Example 1, and the inorganic fillers described above were changed to the ratios shown in Table 3. The results are shown in Table 3.

TABLE 3

| | Experimental No. | | | |
|---|---|---|---|---|
| | 13 | 14 | 15 | 16 |
| [Thermoplastic resin composition parts by weight)] | | | | |
| PBT-1 | 41.0 | 46.1 | | 30.7 |
| PBT-2 | | | | |
| PET | 20.5 | | 46.1 | 15.4 |
| Acrylic resin No. 1 | | 15.4 | 15.4 | 30.8 |
| Acrylic resin No. 2 | | | | |
| Polymer particle of multi-layer structure | 15.4 | 15.4 | 15.4 | |
| Inorganic filler | | | | |
| Calcium carbonate | 23.1 | 23.1 | 23.1 | 23.1 |
| Talc | | | | |
| [Properties of resin molded article (resin board)] | | | | |
| Surface gloss (%) | 85 | 10 | 28 | 85 |
| Storage modulus in common logarithm (Mpa) | 8.2–8.6 | 7.5–8 | 7.5–8 | 7.5–8 |
| Cooling distortion ratio (kg/cm² · °C.) | 0.6 | 0.7 | 0.7 | 1.5 |
| Izod impact strength (kj/m²) | 3.5 | 3.2 | 2.8 | 1.0 |
| Linear expansion coefficient (cm² · °C./°C. × 10⁵) | 0.9 | 0.8 | 0.9 | 0.9 |
| [Properties of composite body] | | | | |

TABLE 3-continued

| | Experimental No. | | | |
|---|---|---|---|---|
| | 13 | 14 | 15 | 16 |
| Heating time during bending process (seconds) | Whitened | 30 | 30 | 50 |
| Falling ball impact strength (kg · cm) | | | | |
| Bending processed part | —[5] | 100 | 100 | 40 |
| Top board part | —[5] | 100 | 100 | 55 |
| Bending (mm) | —[5] | 0.7 | 0.7 | 1.8 |

[5] not measured.

The results in Tables 1 and 2 indicate that the thermoplastic resin molded articles of Experimental Nos. 1 to 6, having the surface gloss of at least one surface above 80%, the storage modulus in common logarithm being 7 to 8 MPa within a temperature range higher by 20° C. to 100° C. than the glass transition temperature, the cooling distortion ratio of 1.0 kg/cm²·°C. or less and the Izod impact strength above 2.0 kj/m², have excellent impact resistance to produce processed articles with less inner distortion and extremely small bending, and with excellent impact resistance with no occurrence of cracks or damage, when the molded article is bending processed under heating.

The results shown in Tables 1, 2 and 3 further indicate that the thermoplastic resin molded articles with such excellent properties can be produced in a smooth fashion by using a thermoplastic resin composition containing a polybutylene terephthalate resin, a polyethylene terephthalate resin, a (metha)acrylic resin, a polymer particle of a multi-layer structure and an inorganic filler, specifically a thermoplastic resin composition containing these components at the specific ratios described above.

As apparent in the aforementioned description, the thermoplastic resin molded article of the present invention has good surface gloss with transparency and high-grade touch with vivid color tones, and therefore, the molded article may satisfactorily be used effectively for a variety of utilities, as it is or after the article is subjected to heating process or other processes to prepare the article as a processed article.

The thermoplastic resin molded article of the present invention has excellent bending processability under heating, in particular, and therefore, the molded article may satisfactorily be prepared as products with various curvature structures and dimensions under heating, in a simple and smooth manner, with no need of cutting process or grinding process.

If used, the thermoplastic resin molded article with such a small cooling distortion ratio during heating process causes less inner distortion in the resulting processed article, whereby the processed article has excellent impact strength, with no occurrence of cracks or damage.

By actively utilizing such properties, the thermoplastic resin molded article of the present invention can be used effectively for housing interior materials and equipment, such as the top boards, doors and walls of system kitchens, the top boards of dressing and washing units, the side walls and aprons of unit baths and the counters of bay windows.

When use is made of the thermoplastic resin composition containing the polybutylene terephthalate resin, the polyethylene terephthalate resin, the (metha)acrylic resin, the polymer particle of a multi-layer structure, the inorganic filler and other components in accordance with the present invention, specifically the thermoplastic resin composition containing a polybutylene terephthalate resin and a polyethylene terephthalate resin at a weight ratio of 4:1 to 1:1, a (metha)acrylic resin at a ratio of 20 to 200 parts by weight to 100 parts by weight of the polybutylene terephthalate resin and the polyethylene terephthalate resin in total, a polymer particle of a multi-layer structure at a ratio of 10 to 100 parts by weight to 100 parts by weight of the polybutylene terephthalate resin, the polyethylene terephthalate resin and the (metha)acrylic resin in total, and an inorganic filler at a ratio of 10 to 40 parts by weight to 100 parts by weight of the thermoplastic resin composition, the thermoplastic resin molded article having such excellent properties can be prepared at a high productivity in a simple and smooth manner by extrusion molding and other thermal melt molding processes.

What is claimed is:

1. A thermoplastic resin molded article having gloss of at least one surface above 80%, a storage modulus in common logarithm being 7 to 8 MPa within a temperature range higher by 20° C. to 100° C. than the glass transition temperature, a cooling distortion ratio of 1.0 kg/cm$^2$.C or less when the molded article is cooled from 130° C. to 50° C. and an Izod impact strength of 2.0 kj/m$^2$ or more, said thermoplastic resin composition containing (A) a polybutylene terephthalate resin, (B) a polyethylene terephthalate resin, (C) a (metha)acrylic resin derived from a methacrylate ester and optionally containing a structural unit derived from an acrylate ester and/or other unsaturated monomers, (D) polymer particles of multi-layer structure where at least the outermost layer contains a hard polymer and an inner layer contains a rubber-type polymer with a glass transition temperature of 25° C. or less, and (E) inorganic filler, wherein (i) the polybutylene terephthalate resin and the polyethylene terephthalate resin are present in a weight ratio of 4:1 to 1:1, (ii) the (metha)acrylic resin is present in a ratio of 20 to 200 parts by weight to 100 parts by weight of the polybutylene terephthalate resin and the polyethylene terephthalate resin in total, (iii) the polymer particle of multi-layer structure is present in a ratio of 10 to 100 parts by weight to 100 parts by weight of the polybutylene terephthalate resin, the polyethylene terephthalate resin and the (metha)acrylic resin in total, and (iv) the inorganic filler is present in a ratio of 10 to 40 parts by weight to 100 parts by weight of the thermoplastic resin composition.

2. A thermoplastic resin molded article according to claim 1, being of a board body.

3. A thermoplastic resin molded article according to any one of claims 1 or 2, being in a composite preparation with other materials.

4. A processed article produced by subjecting the thermoplastic resin molded article according to claims 1 or 2 to heating process.

5. A thermoplastic resin composition containing (A) a polybutylene terephthalate resin, (B) a polyethylene terephthalate resin, (C) a (metha)acrylic resin derived from a methacrylate ester and optionally containing a structural unit derived from an acrylate ester and/or other unsaturated monomers, (D) polymer particles of multi-layer structure where at least the outermost layer contains a hard polymer and an inner layer contains a rubber-type polymer with a glass transition temperature of 25° C. or less, and (E) inorganic filler, wherein (i) the polybutylene terephthalate resin and the polyethylene terephthalate resin are present in a weight ratio of 4:1 to 1:1, (ii) the (metha)acrylic resin is present in a ratio of 20 to 200 parts by weight to 100 parts by weight of the polybutylene terephthalate resin and the polyethylene terephthalate resin in total, (iii) the polymer particle of multi-layer structure is present in a ratio of 10 to 100 parts by weight of 100 parts by weight of the polybutylene terephthalate resin, the polyethylene terephthalate resin and the (metha)acrylic resin in total, and (iv) the inorganic filler is present in a ratio of 10 to 40 parts by weight to 100 parts by weight of the thermoplastic resin composition.

6. A method for producing a thermoplastic resin molded article by using a thermoplastic resin composition according to claim 5 by extrusion molding.

* * * * *